UNITED STATES PATENT OFFICE 2,145,796

PROCESS OF PREPARING RENNIN

Havard L. Keil and Betty K. Stout, Chicago, Ill., assignors to Armour and Company, Chicago, Ill., a corporation of Illinois No Drawing. Application March 1, 1937,
Serial No. 128,548

5 Claims. (Cl. 195—66)

This invention relates to processes of preparing rennin, and it comprises processes wherein rennin-containing animal tissues such as calf stomachs are extracted with a dilute acid solution having a pH value of one or less, and the hydrogen ion concentration of the extract regulated to render rennin therein less soluble, while maintaining mucin therein soluble, the rennin being then salted out and recovered as a dry product.

Large quantities of rennin are used in the manufacture of cheese. Present method of obtaining rennin consists in extracting it from calf stomachs and other sources rich in this enzyme. In these methods the calf stomachs are minced, admixed with very weak acid solutions having a pH of about 5.5, the liquid portions of the mixture separated from the solid portions, and the rennin in the liquid portions salted out. During the salting out operation much of the mucin present in the extract is also precipitated so that the rennin product is highly impure. The activity of rennin is customarily determined by its milk coagulating power. An ordinary liquid rennin purchased in the open market for coagulating milk will have an activity such that one pound of the liquid will coagulate about 7,000 pounds of milk.

We have now discovered improved ways of isolating rennin from the usual sources and as a result of our methods we are able to obtain a rennin which is many times more active, pound for pound, than the present rennin products of commerce. This marked increase in activity is due largely to the fact that our rennin products contain less impurities. It is not due to any actual change in the rennin itself. Thus, for example, by our processes, we have been able to obtain a dry rennin of such purity that one pound thereof will coagulate 300,000 pounds of milk. When this pure rennin is dissolved in water in the usual way to give concentrations of rennin therein comparable with the usual liquid rennin solutions, we find that 1 pound of our liquid rennin will coagulate as much as 20,000 pounds of milk. This will indicate the high degree of purity of our products. Moreover, by our methods, the yield of rennin is larger because our processes avoid the losses of available rennin which are inherent in prior processes.

Our invention is largely based upon accurate control of conditions during the extraction of the rennin from calf stomachs or other sources. We operate in such a manner that practically all of the rennin is extracted from the stomach under conditions which preclude any destruction of the available rennin. Moreover, mucin is the only impurity present in our extract in any substantial quantity, and we have discovered that by controlling hydrogen ion concentration the rennin can be rendered insoluble and collected as a curd while the mucin is kept soluble in the extract. To put it another way, by the appropriate hydrogen ion control which we shall presently describe we are able to effect precipitation of substantially all of the rennin in the extract without precipitation of mucin or other impurities. Consequently, our rennin product has high activity per pound because of its freedom from mucin and other impurities.

We shall now describe our process in detail with special reference to the recovery of rennin from calf stomachs since this is the usual source of this enzyme. Our processes are equally applicable to other animal tissue sources of rennin, but calf stomachs are preferred.

To 1 part by weight (for example, 100 pounds) of fresh whole calf stomachs is added a solution of about 2 parts by weight of water acidified to a pH of about 1. This acid solution can be made from about 200 pounds of water containing 1,000 cubic centimeters of concentrated hydrochloric acid having the usual specific gravity of 1.18. The mixture is then heated to a temperature of about 42° C. and slowly stirred. One convenient way of heating the mixture is by introducing steam directly into the mixture, care being taken to keep the mixture agitated to avoid overheating. Other ways of maintaining the temperature stated can, of course, be used. The acidified mixture is kept at the stated temperature for about forty-five minutes in order to thoroughly extract the mucosa. During the heating period digestion occurs and the stomachs slough most of the mucosa, leaving the connective and muscular tissue as an insoluble residue. The liquid mass thickens due to the presence of extracted mucin, and the entire batch is then poured into about 4 parts by weight, or 400 pounds, of ice water which will lower the temperature of the mixture to about 19° C. The cold water stops any further digestion and protects the rennin from any further peptic action. Advantageously, all operations are maintained in a chill room where the temperature is only a few degrees above 0° C. The temperature of the mixture is allowed to fall to about 15° C. and the mixture is then poured into filter-cloth bags filled with wet excelsior. We have discovered that wet excelsior is an especially advantageous filter medium for filtering mixtures of this type. Using excelsior the filtration is rapid and requires only three hours for completion. Mucosa proteins, fats and foreign matter, such as hairs, are removed. The stomachs are allowed to drain while in the filter bags. A clear juice or extract containing mostly rennin and mucin passes through the filter and is collected.

We have further discovered that when such an extract is partially neutralized to reduce its acidity to a pH of about 4.5 the rennin is rendered much less soluble while the solubility of the mucin is unaffected. The isoelectric point of mucin is about pH 3. Consequently, the mucin in the extract remains dissolved therein, but, as stated, the solubility of the rennin is much lessened. Therefore, to the clear filtrate or extract we add caustic soda until the pH is increased to about 4.5. We then add sodium chloride while stirring until the solution becomes saturated therewith. This causes a substantially complete precipitation of all of the rennin present. It is advantageous to let the mixture stand for about thirty minutes during which time the rennin rises as a curd to the surface of the mixture. The curd is then skimmed off readily and transferred to driers. If the extract be maintained in its container for an hour or two longer a second curd, much smaller in quantity than the first, also rises to the top of the liquid and this second curd also containing rennin, can be skimmed off and added to the first mentioned curd.

If a dry product is desired the curds can be spread as a thin layer on enameled trays and dried in a current of warm air. This dried product is so active that one pound thereof will coagulate about 300,000 pounds of milk. The dry product can be diluted to any strength by the addition of lactose or any other soluble edible solid diluent. When making a liquid rennin the wet curd can be put into solution in water in any of the well known ways, or the dried product can be dissolved in water.

In contrast with prior processes our invention has many advantages. In the first place, we need not grind the calf stomachs nor need we subject the dry rennin to a defatting operation. In prior processes the calf stomachs are always ground prior to extraction; and the dry rennin obtained therefrom is associated with large quantities of fat which must be removed with fat solvents.

Our extraction treatment is conducted at relatively high hydrogen ion concentration. This activates the proteolytic enzymes within the gastric mucosa of the stomach and results in liberation of the active rennin. In the above stated example we have given the optimum acidity, dilution, temperature and time necessary to give the maximum yield of rennin.

The use of wood excelsior as filter medium for filtering a solution high in mucin for the removal of solids is a marked step forward in the art. It is very difficult to filter solutions containing large quantities of rennin and mucin by any of the ordinary ways. Various filter aids now on the market absorb the enzyme which is, of course, disadvantageous. We do not, however, wish to be limited to the use of a wood excelsior filter. The extract can be separated from insoluble materials by settling, decanting, or centrifuging if desired.

The separation of the rennin as a curd from a concentrated sodium chloride solution of rennin and mucin having a closely regulated hydrogen ion concentration is another step of such importance that we specifically claim it in the appended claims. As noted above, in this step we so control the hydrogen ion concentration and dilution of the extract that the solution is at the maximum solubility point for mucin whereas it is at a minimum solubility point for rennin.

Consequently, in broadest aspects our invention comprises the precipitation of rennin from a concentrated salt solution thereof having a pH of about 4.5. But we do not wish to be limited to this exact hydrogen ion concentration since slight departures therefrom can be used. The mucin is soluble in a saturated salt solution at pH values above 3 or 3.3. So long as the mucin is kept soluble we can operate at any hydrogen ion concentration which will reduce the solubility of some or all of the rennin. Obviously, however, we find it best to use hydrogen ion concentrations which give an optimum precipitation of rennin.

The temperature given above, namely 42° C. is the temperature at which we obtain the best results. We do not wish to be limited to this precise temperature since some variations therefrom can be practised. The proteolytic digestion of the stomach for liberating the rennin is best carried on at a temperature of about that stated since enzyme activity is then high. We can, however, work at somewhat lower temperatures such as 36° C. or at moderately higher temperatures such as 45° C. The length of time during which the extraction occurs is also subject to variation depending upon quality of the calf stomachs used. Some may require a longer digestion time in order to dissolve the mucosa and others will require less. Those skilled in the art will, of course, be able to judge when the extraction is substantially complete. Likewise, the temperature to which the extract is lowered can vary over quite wide limits. The temperature is reduced primarily to stop further digestion and thus protect the rennin in the extract. Reduction of temperatures to ordinary room temperature of 20° C. or lower is enough, but temperatures below this are better since they positively insure no further peptic action on the rennin.

Having thus described our invention, what we claim is:

1. The process of obtaining rennin from animal stomachs which comprises admixing the animal stomachs with a hydrochloric acid solution having a pH of about 1, maintaining the mixture at a moderately elevated temperature to promote digestion therein, diluting the digested mixture with cold water before the rennin therein undergoes substantial digestion, separating insoluble substances from the mixture to get a water extract of rennin and mucin, adjusting the hydrogen ion concentration of the extract to lessen the solubility of the rennin therein while keeping the mucin soluble, and then salting out the rennin.

2. The process of obtaining rennin from animal stomachs which comprises admixing the animal stomachs with a hydrochloric acid solution having a pH of about 1, maintaining the mixture at a temperature of about 42° C. to promote digestion therein, diluting the digested mixture with cold water before the rennin therein undergoes substantial digestion, separating insoluble substances from the mixture to get a water extract of rennin and mucin, adjusting the hydrogen ion concentration of the extract to lessen the solubility of rennin therein while keeping the mucin soluble, and then salting out the rennin.

3. The process as in claim 1 wherein the hydrogen ion concentration of the extract during salting out of the rennin is maintained at about pH 4.5.

4. The process as in claim 2 wherein the hydrogen ion concentration of the extract during salting out of the rennin is maintained at about pH 4.5.

5. The process of obtaining rennin from calf stomachs which comprises admixing about one part by weight of calf stomachs with about two parts by weight of water having a hydrogen ion concentration of about pH 1, heating the mixture to a temperature of about 42° C. to promote digestion therein, diluting the mixture with about 4 parts by weight of cold water before the rennin therein undergoes substantial digestion, separating insoluble substances from the mixture to get a water extract of rennin and mucin, adding alkali to adjust the hydrogen ion concentration to about 4.5, and then salting out the rennin.

HAVARD L. KEIL.
BETTY K. STOUT.